Jan. 5, 1926.

E. PFIFFNER 1,568,918

ELECTRIC CONDENSER

Filed March 19, 1923

Inventor:
E. Pfiffner

Patented Jan. 5, 1926.

1,568,918

UNITED STATES PATENT OFFICE.

EMIL PFIFFNER, OF FRYBOURG, SWITZERLAND.

ELECTRIC CONDENSER.

Application filed March 19, 1923. Serial No. 626,151.

*To all whom it may concern:*

Be it known that I, EMIL PFIFFNER, a citizen of the Republic of Switzerland, residing at Frybourg, Switzerland, have invented certain new and useful Improvements in Electric Condensers (for which I have filed an application for patent in Germany, Feb. 10, 1922), of which the following is a specification.

This invention relates to an electric condenser consisting of superimposed and parallel connected part-condensers in any desired arrangement.

The essential feature of the condenser according to the present invention consists in that the plates, forming the individual part-condensers, are disposed at least at the coated margins at an increased distance, in order to weaken the electric field extending at the margin from plate to plate.

Further according to the present invention insulating layers are arranged between the electrically connected metal-coatings of like polarity, whereby it is a further characteristic that these layers possess a smaller dielectric constant than the condenser dielectric. A further feature consists in the insertion or provision of distance-members, so that the spaces formed thereby at the coated margins may be filled-up with an insulating substance.

It is well known, that the metal coating of electric condensers has to be in an intimate contact with the surface of the dielectric, whereby any intermediate layer such as air or consisting of any other material of a smaller disruptive strength and generally also of a smaller dielectric conductivity has to be avoided. If this condition has been satisfied for the individual plates of a condenser, for instance by placing the metal coatings by means of a high pressure or a chemical precipitation or any other means into intimate contact with the individual insulating plates, the result intended to be attained by these precautions may be still disturbed by the conditions at the margin of the coatings; this being particularly the case with thin insulating layers.

The drawing illustrates diagrammatically and in section condenser plates on an enlarged scale.

In all figures the homopolar coatings, which are electrically connected with one another, are designated by + (positive) and — (negative) marks respectively.

Fig. 1 shows the electric field development at the margin of the coatings, if the bottom coating of the insulating plate 2 is somewhat projecting. At this place the field extends between the bottom coating of the insulating plate 1 and the bottom coating of the insulating plate 2. However the coating of the plate 1 is not in an intimate contact with the plate 2, and the sectioned space 4 is filled either with air or with an insulating material. Now if the plates 1 and 2 possess a high dielectric constant and the medium in 4 a smaller dielectric constant and further also a smaller disruptive strength, as it is generally the case, the layer 4 will be easily pierced and at that place sparks are formed on the surface of the plate 2, which will gradually heat and destroy the structure of the insulating material of the plate 2, until the break through is started between the bottom positive and negative coatings and the condenser is punctured.

However on providing a space filled with a suitable insulating medium and establishing a certain distance between the margins of the plates 1 and 2, or on inserting an insulating plate according to Fig. 2 between the two metal coatings of the same polarity, the passage or way of the electric field lines will be increased and therefore the field will be weakened, this being the more if the dielectric constant of the introduced medium or plate 5 is small. The necessary strength (thickness) of the intermediate layer 5 may be easily determined by calculation.

Figure 1:
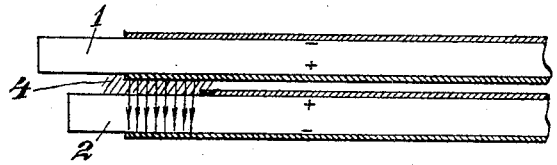
Figure 2:
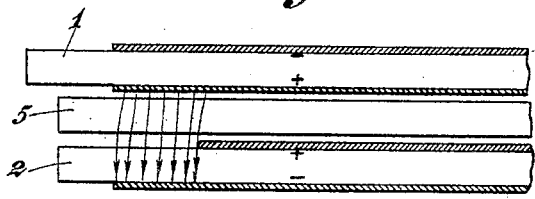
Figure 3:
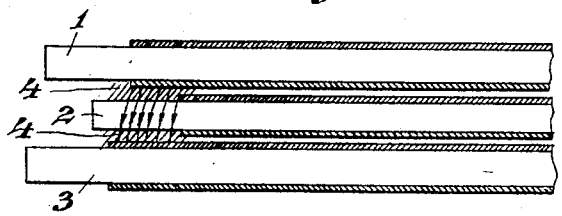
Fig. 3 illustrates the same arrangement, but with the plate-margins displaced with respect to each other or with an insulating margin of unlike width. In this arrangement the field extends between the bottom coating of the plate 1 and the top coating of the plate 2.
Figure 4:
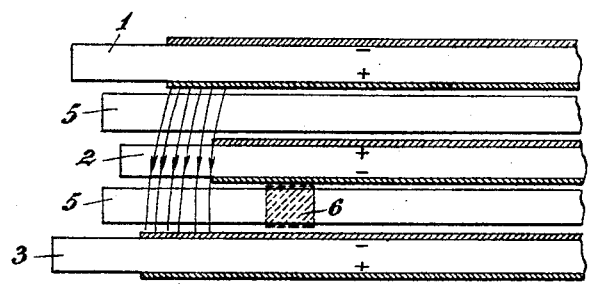
Fig. 4 illustrates a modified arrangement provided with an interposed insulating plate 5.

The insulating plate 5 may be replaced by a distance member 6, which consists of a conducting material if it does not project beyond the coatings and of an insulating material if it projects beyond the margin, so that the said material will fill the space in place of the plate 5.

The described construction is applicable for condensers consisting of several layers arranged in any desired manner, for instance, flat, rolled, folded and so forth.

I claim:—

1. An electric condenser consisting of superimposed and parallel connected part-condensers including dielectrics and metal coatings, the metal coating of each dielectric being in intimate contact with the dielectric and the coatings of like polarity facing each other, varying in length and arranged a distance apart at least at the margin of the condenser to increase the path between the coatings of unlike polarity at the margins of the condenser.

2. An electric condenser consisting of superimposed and parallel connected part-condensers including dielectrics and metal coatings, the metal coating of each dielectric being in intimate contact with the dielectric and the metal coatings of like polarity facing one another, varying in length and arranged a distance apart at least at the margin of the condenser to increase the path between the coatings of unlike polarity at the margins of the condenser and being electrically connected with each other, and an insulating layer interposed between the metal coatings of like polarity adapted to protect the margins of the coatings which do not exactly cover-up each other.

3. An electric condenser consisting of superimposed and parallel connected part-condensers including dielectrics and metal coatings, the metal coating of each dielectric being in intimate contact with the dielectric and the metal coatings of like polarity facing one another, varying in length and arranged a distance apart at least at the margin of the condenser to increase the path between the coatings of unlike polarity at the margins of the condenser and being electrically connected with each other, and an insulating layer of a material having a smaller dielectric constant than the condenser dielectric interposed between the metal coatings of like polarity.

4. An electric condenser consisting of superimposed and parallel connected part-condensers including dielectrics and metal coatings, the metal coating of each dielectric being in intimate contact with the dielectric and the metal coatings of like polarity facing one another, varying in length and arranged a distance apart at least at the margin of the condenser to increase the path between the coatings of unlike polarity at the margins of the condenser, and a distance member disposed between the coated part-condensers in such a manner that the space is filled-up with an insulating mass at the margins of the coatings.

5. An electric condenser consisting of superimposed and parallel connected part-condensers dielectric and metal coatings, the metal coating of each dielectric being in intimate contact with the dielectric and the metal coatings of like polarity facing one another, varying in length and arranged a distance apart at least at the margin of the condenser to increase the path between the coatings of unlike polarity at the margins of the condenser, and distance members disposed between the coated part-condensers in such a manner that the space is filled-up with an insulating mass at the margins of the coatings.

In testimony whereof I hereunto affix my signature.

EMIL PFIFFNER.